United States Patent
Cariello (10) Patent No.: US 12,159,041 B2
(45) Date of Patent: *Dec. 3, 2024

(54) TECHNIQUES FOR FAILURE MANAGEMENT IN MEMORY SYSTEMS

(71) Applicant: Micron Technology, Inc., Boise, ID (US)

(72) Inventor: Giuseppe Cariello, Boise, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 17/963,800

(22) Filed: Oct. 11, 2022

(65) Prior Publication Data

US 2023/0104752 A1  Apr. 6, 2023

Related U.S. Application Data

(63) Continuation of application No. 17/242,163, filed on Apr. 27, 2021, now Pat. No. 11,481,123.

(51) Int. Cl.
*G06F 3/06* (2006.01)

(52) U.S. Cl.
CPC .......... *G06F 3/0619* (2013.01); *G06F 3/0656* (2013.01); *G06F 3/0679* (2013.01)

(58) Field of Classification Search
CPC .... G06F 3/0619; G06F 3/0656; G06F 3/0679; G06F 3/0611; G06F 3/0647; G06F 3/0667; G06F 3/0671; G06F 11/0751; G06F 11/0793; G06F 11/073; G06F 11/203; G06F 11/2033

See application file for complete search history.

(56) References Cited

U.S. PATENT DOCUMENTS

| 9,502,126 | B1 | 11/2016 | Hyun | |
|---|---|---|---|---|
| 11,360,707 | B2 | 6/2022 | Seo et al. | |
| 11,481,123 | B1* | 10/2022 | Cariello | G06F 3/0619 |
| 2007/0101095 | A1* | 5/2007 | Gorobets | G06F 12/0246 |
| | | | | 711/E12.008 |
| 2010/0082887 | A1* | 4/2010 | Mitsunaga | G06F 12/0246 |
| | | | | 711/E12.016 |

(Continued)

FOREIGN PATENT DOCUMENTS

CN    102810068 A    12/2012

OTHER PUBLICATIONS

Chinese Patent Office, "Office Action," issued in connection with Chinese Patent Application No. 202210441444.3. dated Aug. 9, 2023 (7 pages) (2 pages of English Translation and 5 pages of Original Document).

*Primary Examiner* — Hiep T Nguyen
(74) *Attorney, Agent, or Firm* — Holland & Hart LLP (57) ABSTRACT

Methods, systems, and devices for techniques for failure management in memory systems are described. A memory system may include one or more non-volatile memory devices. A set of physical blocks of memory cells of the one or more non-volatile memory devices may be grouped into virtual blocks, where each physical block of a virtual may block may be within a different plane of the one or more non-volatile memory devices. The memory system may detect a failure within a physical block of a virtual block and may transfer data from the physical block to one or more other physical blocks within the same virtual block in response to detecting the failure.

20 Claims, 5 Drawing Sheets

(56) References Cited

U.S. PATENT DOCUMENTS

| | | | |
|---|---|---|---|
| 2012/0215964 A1* | 8/2012 | Kaneko | G06F 12/0246 |
| | | | 711/E12.008 |
| 2012/0311237 A1 | 12/2012 | Park | |
| 2013/0166949 A1* | 6/2013 | Um | G06F 11/073 |
| | | | 714/15 |
| 2014/0032993 A1 | 1/2014 | Yang et al. | |
| 2014/0289453 A1* | 9/2014 | Takeda | G06F 12/0246 |
| | | | 711/103 |
| 2015/0287478 A1 | 10/2015 | Chen et al. | |
| 2017/0118664 A1* | 4/2017 | Lee | H04W 4/80 |
| 2019/0303287 A1 | 10/2019 | Kazama | |
| 2019/0324855 A1* | 10/2019 | Yeh | G11C 29/52 |
| 2020/0150903 A1* | 5/2020 | Chu | G06F 3/0688 |
| 2020/0174882 A1 | 6/2020 | Kim et al. | |
| 2021/0026564 A1* | 1/2021 | Her | G06F 3/0652 |
| 2021/0181952 A1 | 6/2021 | Han et al. | |
| 2021/0405888 A1 | 12/2021 | Park | |
| 2022/0083223 A1 | 3/2022 | Choi et al. | |

\* cited by examiner

TECHNIQUES FOR FAILURE MANAGEMENT IN MEMORY SYSTEMS

CROSS REFERENCE

The present Application for Patent is a continuation of U.S. patent application Ser. No. 17/242,163 by Cariello, entitled "TECHNIQUES FOR FAILURE MANAGEMENT IN MEMORY SYSTEMS", filed Apr. 27, 2021, assigned to the assignee hereof, and is expressly incorporated by reference in its entirety herein.

FIELD OF TECHNOLOGY

The following relates generally to one or more systems for memory and more specifically to techniques for failure management in memory systems.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Memory devices of a memory system may include various groupings of memory cells in which data is stored. For example, a memory device may include one or more memory dies, each of which may include memory cells organized as pages, physical blocks, and planes, among other groupings of memory cells. In some examples, the memory system may organize multiple physical blocks into virtual blocks, where a virtual block may include some quantity of physical blocks. In some cases, at least initially, a virtual block may include a set of physical blocks that each have a same block address but are located within different planes of the memory system (the different planes included in one or more dies).

Over time, one or more pages of a physical block may fail, for example, due to wear out, damage to one or more structures of the physical block, physical defects of the physical block, or for some other reason. In some cases, the memory system may detect a failure within a physical block (e.g., one or more failed pages of the physical block) of a virtual block and may replace the failed physical block with a different physical block (which may be referred to as a redundant physical block or alternatively as a replacement physical block) in response to detecting the failure.

In some memory systems, however, error handling in response to detecting the failure may increase a latency of operations associated with the virtual block. For example, based on detecting the failed physical block, the memory system may pause operations associated with the virtual block until after replacing the failed physical block in the virtual block and writing any recovered data to the redundant physical block, thereby increasing the latency of the operations. Additionally, in some cases, replacing the failed physical block with the redundant physical block may increase a complexity of media management operations (e.g., wear leveling operations) due to the redundant physical block having a different level of wear with respect to the other physical blocks of the virtual block. In other examples, the memory system may stop using the virtual block that includes the failed physical block, activate a reserved virtual block, and refresh the virtual block (e.g., copy over information included in the virtual block to the reserved virtual block and switch virtual block pointers), paying the cost of the extra virtual block reserved for the refresh. Additionally or alternatively, the memory system may reserve some random access memory (RAM) cells as a buffer for copying data from the failed physical block to the redundant physical block, thereby reducing system performance (e.g., due to a reduced quantity of RAM cells and physical blocks available for other operations) and storage capacity and/or increasing a cost of the memory system.

Techniques, systems, and devices are described herein may beneficially reduce latency and complexity and increasing system performance associated with failure management in memory systems. For example, the memory system may detect a failure within a physical block of a virtual block. In response to detecting the failure, the memory system may transfer data (e.g., recovered data) from the failed physical block to a buffer (e.g., a RAM buffer) of the memory system. Then, the memory system may transfer the data from the buffer to one or more other physical blocks of the virtual block (e.g., different from the failed physical block). That is, the memory system may transfer recovered data from the failed physical block to one or more other physical blocks of the virtual block without (e.g., or before) replacing the failed physical block with a redundant physical block. Additionally, in some examples, the memory system may perform other operations (e.g., access operations such as read and write operations) concurrently with transferring the data to and from the buffer. Accordingly, latency, complexity, cost, and system performance associated with failure management of the memory system may be improved.

Figure 1:
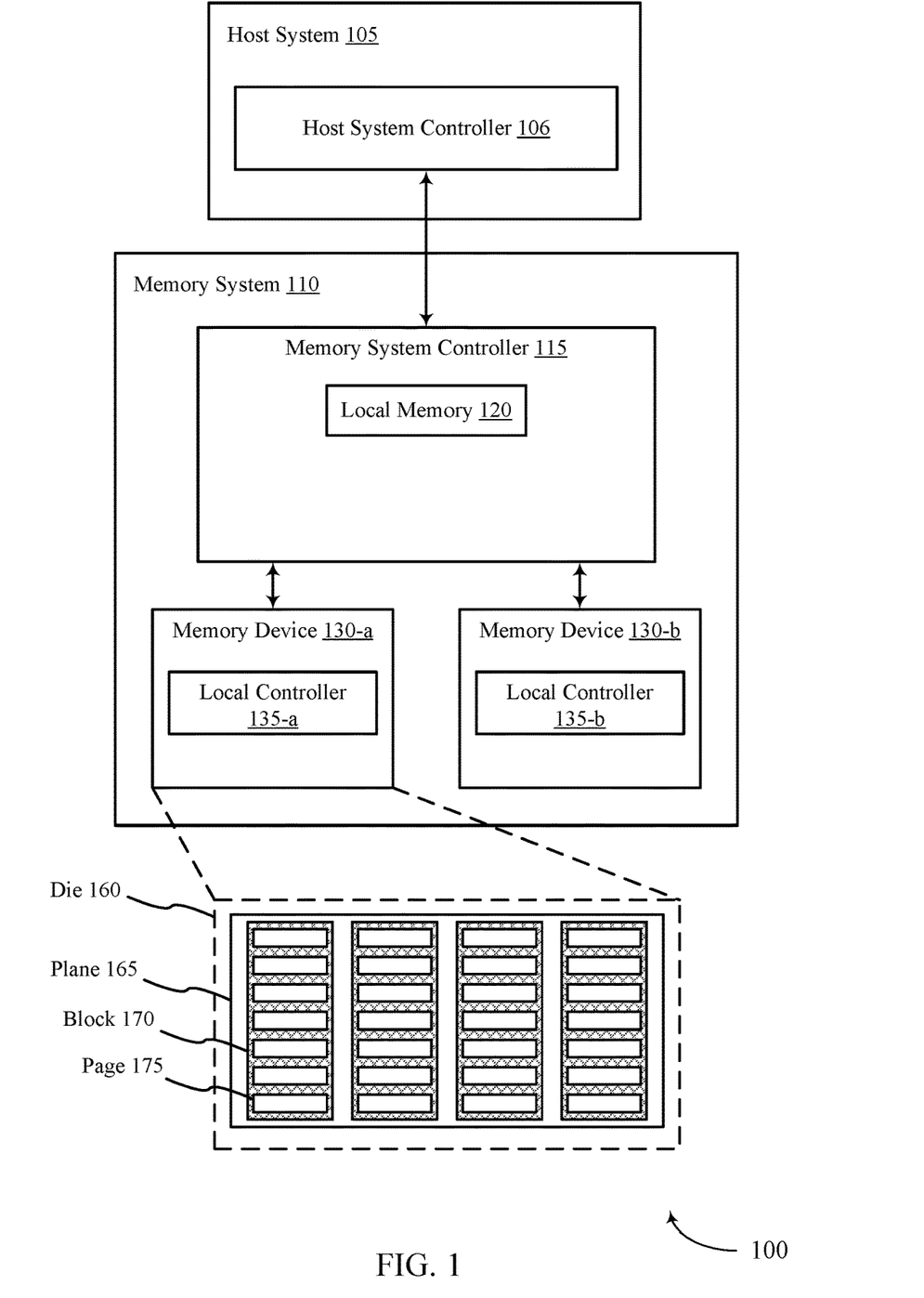
FIG. 1 illustrates an example of a system that supports techniques for failure management in memory systems in accordance with examples as disclosed herein.

Features of the disclosure are initially described in the context of a system with reference to FIG. 1. Features of the disclosure are described in the context of memory schemes with reference to FIGS. 2-3. These and other features of the disclosure are further illustrated by and described in the context of an apparatus diagram and flowchart that relate to techniques for failure management in memory systems with reference to FIGS. 4-5.

FIG. 1 illustrates an example of a system 100 that supports techniques for failure management in memory systems in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open not-and (NAND) Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130a and 130b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or any combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive RAM (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some examples (e.g., to support improved memory management), the memory system 110 may organize (e.g., using the memory system controller 115 or a local controller 135) groups of blocks 170 into virtual blocks. In some examples, a virtual block may initially be configured to include a set of blocks 170 that each have a same block address (e.g., a same block number or index) but are each located within different planes 165 of one or more dies 160 of a memory device 130. For example, a virtual block 0 may initially be configured to include block 0 (e.g., block 170 having block address 0) from a first plane 165 of the memory device 130, block 0 from a second plane 165 of the memory device 130, and so on. The blocks within a virtual block may in some cases span multiple memory dies 160 (e.g., may span multiple memory devices 130).

In some examples, virtual blocks may be organized such that parallel (e.g. concurrent) operations (e.g., write operations, read operations) may be performed on the blocks 170 included in a respective virtual block. Additionally, virtual blocks may be logical groupings of blocks 170 (e.g., a virtual block may be a software entity managed by firmware). Accordingly, the memory system 110 may support changing which blocks 170 are included within a virtual block over time. For example, the memory system controller 115 or a local controller 135 may remove blocks 170 from, add blocks 170 to, or replace blocks 170 within virtual blocks (e.g., or a combination thereof) over time. As a result, virtual blocks may include a set of blocks 170 that include some blocks 170 having different block addresses. In some cases, the memory system 110 may store and maintain one or more tables associated with virtual blocks (e.g., using the memory system controller 115 or the local controller 135) to determine which blocks 170 are included within a respective virtual block. To change which blocks 170 are included within a virtual block, the memory system controller 115 or the local controller 135 may update a table (e.g., or an entry of the table) corresponding to the virtual block to indicate the change.

In some cases, one or more pages 175 or other aspects of a block 170 of a virtual block may fail, and the memory system 110 may detect the failure within the block 170. The memory system 110 (e.g., using the memory system controller 115 or a local controller 135) may transfer data (e.g., recovered data) from the failed physical block 170 to a buffer of the memory system 110 (e.g., the local memory 120, a buffer of the local controller 135, or some other buffer of the memory system 110 that includes RAM cells). Then, the memory system 110 may transfer the data from the buffer to one or more other blocks 170 of the virtual block (e.g., different from the failed block 170). In this way, the memory system 110 may transfer recovered data from the failed block 170 to the one or more other blocks 170 of the virtual block without (e.g., or before) replacing the failed block 170 with a redundant block 170. Additionally, in some examples, the memory system 110 may perform other operations (e.g., access operations such as read and write operations) concurrently with transferring the data to and from the buffer.

The system 100 may include any quantity of non-transitory computer readable media that support techniques for failure management in memory systems. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

Figure 2:
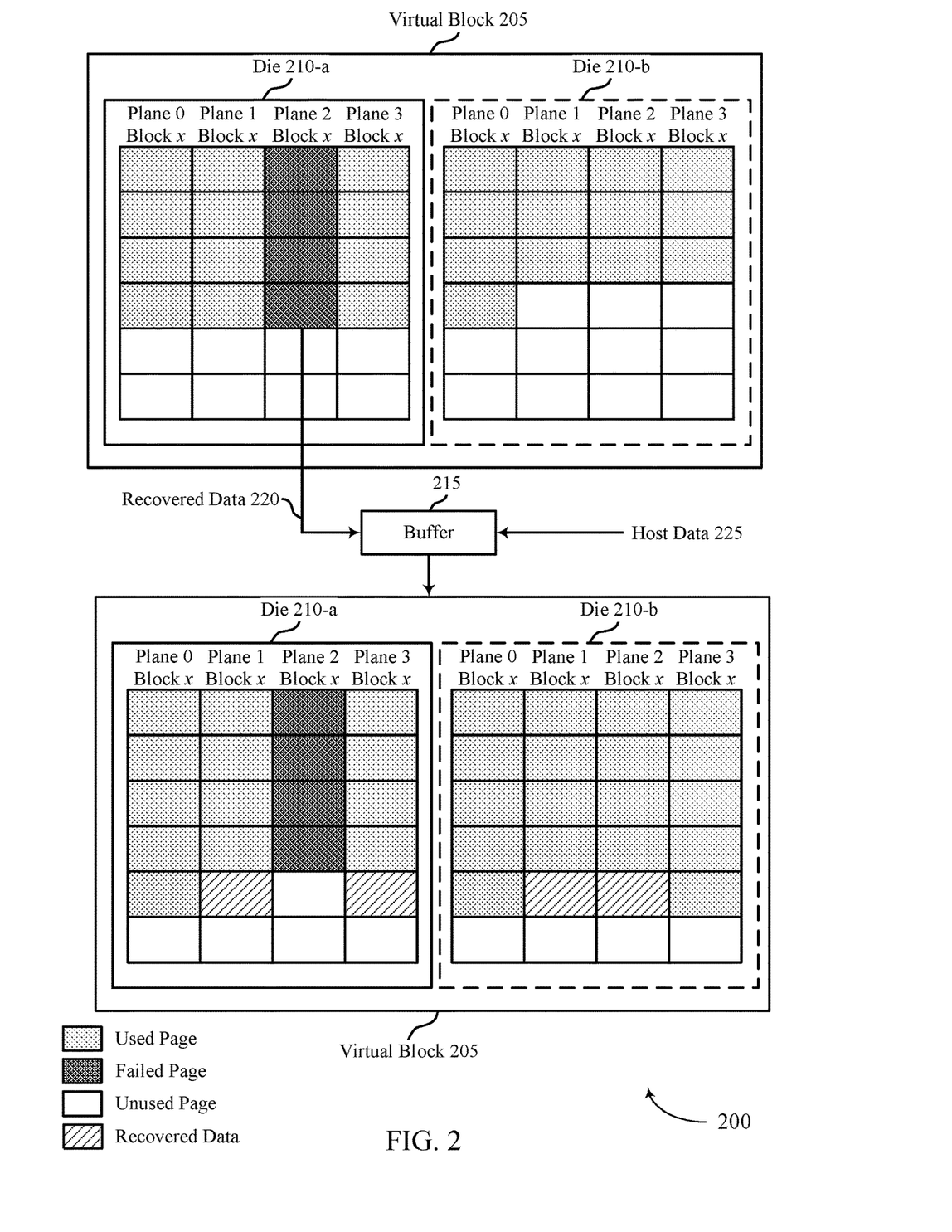
FIGS. 2 and 3 illustrate examples of memory schemes that support techniques for failure management in memory systems in accordance with examples as disclosed herein.

FIG. 2 illustrates an example of a memory scheme 200 that supports techniques for failure management in memory systems in accordance with examples as disclosed herein. In some examples, the memory scheme 200 may be implemented by components of a memory system such as a memory system 110 described with reference to FIG. 1. For example, the memory scheme 200 may be implemented by a controller of a memory system such as a memory system controller 115 or a local controller 135 as described with reference to FIG. 1. In some examples, the memory scheme 200 may be implemented to support improvements to latency, media management complexity, performance, storage capacity, and cost, among other benefits.

The memory scheme 200 depicts a virtual block 205 that includes a set of blocks of memory cells (e.g., a set of blocks 170 as described with reference to FIG. 1). In some examples, the virtual block 205 may be configured, at least initially, to include blocks having a same block address (e.g., a same block number) that are each located within different planes (e.g., planes 165 as described with reference to FIG. 1) of one or more dies 210 of the memory system (e.g., dies 160 as described with reference to FIG. 1). For example, the virtual block 205 may include block x from planes 0 through 3 of one or both of dies 210a and dies 210b, where x is some block address. In some other examples, one or more of the blocks of the virtual block 205 may have a different block address of a respective plane. For example, the virtual block 205 may include a blocky of plane 1 of die 210-a, where y is some block address different from x (not shown). In some examples, the virtual block 205 may be a logical grouping of blocks, and the controller may support changing which blocks are included within the virtual block 205.

The memory scheme 200 additionally depicts a buffer 215 that is used to transfer data throughout the memory system. For example, the controller may include or be coupled with the buffer 215 and may use the buffer 215 to temporarily store data being transferred between the memory system and a host system or within the memory system. The buffer 215 may be an example of a volatile memory device (e.g., a local memory 120) that is associated with relatively fast operations. For example, the buffer 215 may include volatile memory cells, RAM cells, SRAM cells, DRAM cells, hardware accelerators, or any combination thereof, to enable fast storage and retrieval of data to and from the buffer 215.

Each block of the virtual block 205 may include a quantity of pages (e.g., any quantity of pages 175 as described with reference to FIG. 1). A page by be a used page that stores valid data or an unused page that stores no data or invalid data. In some cases, the virtual block 205 may be associated with non-volatile memory storage. For example, the pages of the virtual block 205 may include non-volatile memory cells such as NAND memory cells, or some other non-volatile memory cells. In some cases, one or more aspects of a physical block may fail. For example, one or more memory cells of a page may become damaged or have defects such that operations (e.g., read operations, write operations) performed on the page fail. In some examples, the controller may determine that a page is a failed page based on a failed operation associated with the page. For example, the controller may determine that one or more pages of block x of plane 2 of die 210-a are failed pages during or in response to an access operation associated with the one or more pages that fails.

The controller may detect a failure of a physical block (e.g., of one or more pages therein) and may perform failure management operations in response to detecting the failure. For example, the controller may attempt to recover data 220 from the block x that includes the one or more failed pages (referred to as the failed block). For instance, the controller may recover some data stored in the one or more failed pages and/or data stored in one or more used pages of the failed block (e.g., that did not fail) and may transfer the recovered data 220 to the buffer 215. Then, the controller may transfer the recovered data 220 from the buffer 215 to one or more pages (e.g., unused) of other blocks of the virtual block 205 (that is, of the same virtual block 205 that included the failed physical block). For example, in FIG. 2, the controller may transfer the recovered data 220 from the buffer 215 to a page of block x of plane 1 of die 210-a, a page of block x of plane 3 of die 210-a, a page of block x of plane 1 of die 210-b, and a block x of plane 2 of die 210-b (although transferring the recovered data 220 to any combination of unused pages of virtual block 205 not included in the failed block is possible).

The controller may perform other operations concurrently with performing the failure management operations (e.g., detecting the failure, recovering data, transferring recovered data 220 to and from the buffer 215, etc.). For example, the controller may receive access commands (e.g., read commands, write commands) associated with storing data in the buffer 215 and may store data associated with the access commands in the buffer 215 concurrently with the recovered data 220. For instance, the controller may receive a write command to store host data 225 from a host system in a non-volatile memory device of the memory system (e.g., in die 210-a, die 210-b, or a combination thereof). The controller may transfer the host data 225 from the host system to the buffer 215 (e.g., before or after transferring the recovered data 220 to the buffer 215) and may store the host data 225 in the buffer 215 together (e.g., concurrently) with the recovered data 220. In some examples, the controller may transfer the host data 225 to the buffer 215 concurrently with transferring the recovered data 220 from the failed block to the buffer 215. Additionally, in some cases, the controller may transfer the host data 225 from the buffer 215 to one or more pages of the virtual block 205 (e.g., not included in the failed block) concurrently with transferring the recovered data 220 from the buffer 215. For example, the controller may concurrently write (e.g., transfer) the host data 225 and the recovered data 220 stored in the buffer 215 to one or more unused pages of the virtual block 205.

In some examples, the controller may refrain from replacing the failed block. As a result, a capacity (e.g., a storage capacity) associated with the virtual block 205 may be changed. For example, the virtual block 205 may be associated with a capacity that corresponds to (e.g., is proportional to) the quantity of blocks included in the virtual block 205. That is, as the quantity of blocks included in the virtual block 205 increases, so does the associated capacity. Accordingly, before the block fails, the virtual block 205 may have a first capacity. Because the controller refrains from replacing the failed block, the virtual block 205 may have a second capacity smaller than the first capacity after the refraining. That is, the virtual block 205 may have a second capacity smaller than the first capacity because the quantity of blocks included in the virtual block 205 after the refraining may be smaller than the quantity of blocks included in the virtual block 205 before the refraining (e.g., and before the block failed). Here, the virtual block 205 may be referred to as a partial virtual block.

To mitigate any performance drawbacks associated with partial virtual blocks, the controller may configure the virtual block 205 to store particular types of data. For example, based on the virtual block 205 having the second capacity (e.g., the smaller capacity), the controller may configure the virtual block 205 to store any combination of small chunk data, data associated with garbage collect operations, or system data, among other types of data. Accordingly, in some examples, the controller may store any combination of small chunk data, data associated with garbage collect operations, or system data in the virtual block 205 after detecting the failure (e.g., and refraining from replacing the failed block). In some examples, small chunk data may be data associated with a first chunk size smaller than a second chunk size associated with data stored in the virtual block 205 before detecting the failure.

Figure 3:
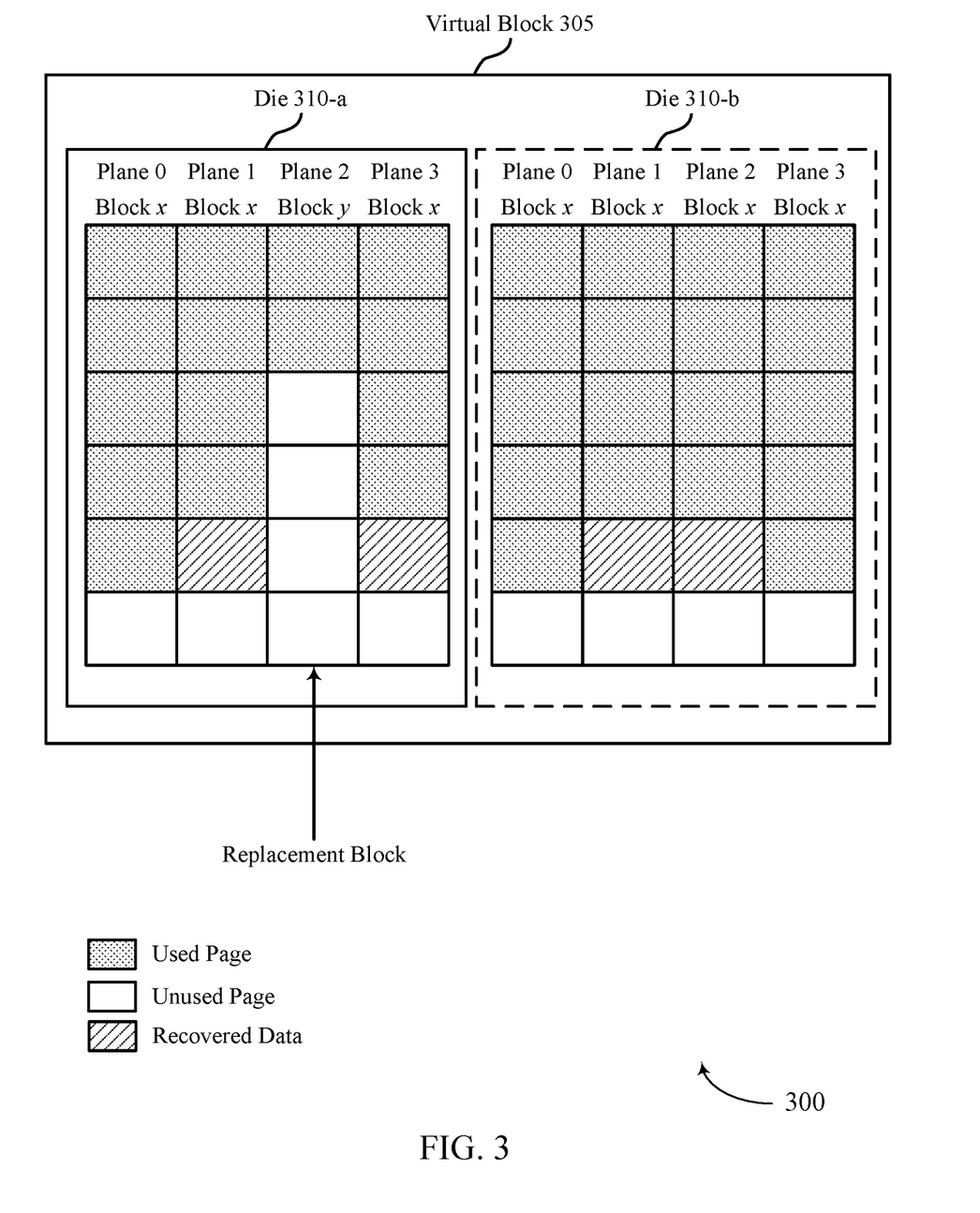

In some cases, the controller may ensure that the failed block is not accessed after detecting the failure. For example, the controller may update a table associated with the virtual block 205 that indicates which blocks are included within the virtual block 205 based on detecting the failure of the one or more pages of the failed block. The table may include a set of indexes that each correspond to a block of the virtual block 205. Accordingly, the controller may read the table (e.g., parse the set of indexes) to determine which blocks are included in the virtual block 205. In some examples, the controller may reference (e.g., read) the table if performing an operation associated with the virtual block 205 to determine which blocks are associated with the operation. The controller may update the table to indicate the failure. That is, the controller may remove, from the table, a first index of the set indexes that corresponds to the failed block in response to detecting the failure so that subsequent operations associated with the virtual block 205 do not include the failed block. In some examples, the table may be stored in a volatile memory device of the memory system (e.g., in local memory 120) while the memory system is on and stored in a non-volatile memory device of the memory system while the memory system is off FIG. 3 illustrates an example of a memory scheme 300 that supports techniques for failure management in memory systems in accordance with examples as disclosed herein. In some examples, the memory scheme 300 may be implemented by components of a memory system such as a memory system 110 described with reference to FIG. 1. For example, the memory scheme 300 may be implemented by a controller of a memory system such as a memory system controller 115 or a local controller 135 as described with reference to FIG. 1.

The memory scheme 300 depicts a virtual block 305 that includes a set of blocks of memory cells. Initially, the virtual block 305 may be configured to include to include blocks having a same block address (e.g., a same block number) that are each located within different planes of one or more dies 210 of the memory system. For example, the virtual block 305 may initially include block x from planes 0 through 3 of one or both of dies 310-a and dies 310-b, where x is some block address. However, in the example of FIG. 3, the controller may replace a failed block with a redundant block after performing failure management operations described herein to transfer recovered data of the failed block to one or more pages of other blocks of the virtual block 305 different from the failed block. For example, the controller may detect a failure within block x of plane 2 of die 310a and may use a buffer of the memory system to transfer recovered data of the failed block to the one or more pages of the other blocks.

In some examples, at some time after transferring the recovered data to the one or more pages of the other blocks within the same virtual block 305, the controller may replace the failed block with a different (e.g., redundant) block of plane 2 of die 310a. For example, the controller may initially refrain from replacing the failed block in order to transfer the recovered data to the one or more pages of the other blocks. Then at some time after, the controller may replace the failed block with a blocky of plane 2 of die 310-a, where y is a block address different from x within plane 2 of die 310-a. As a result, the remaining blocks of the virtual block 305 may have a same block address (e.g., x) that is different from the block address of the replaced block (e.g., y). In some examples, the controller may configure the virtual block 305 as a partial virtual block between transferring the recovered data to the one or more pages of the other blocks and replacing the failed block with blocky of plane 2 of die 310-a. In some examples, the controller may update a table associated with the virtual block 305 that indicates which blocks are included in the virtual block 305 to indicate the replacement. For example, the controller may remove an index from the table corresponding to the failed block and add an index to the table corresponding to the replacement block.

In some examples, the controller may perform failure management operations as described herein in response to detecting subsequent failures within blocks of the virtual block 305. For example, after replacing the failed block, the controller may detect failures within other block(s) of the virtual block 305 or the replacement block, transfer recovered data from the newly failed block(s) to the buffer, and transfer data from the buffer to one or more unused pages of other blocks of the virtual block 305 different from the newly failed block(s), among other operations performed by the controller as described herein.

Figure 4:
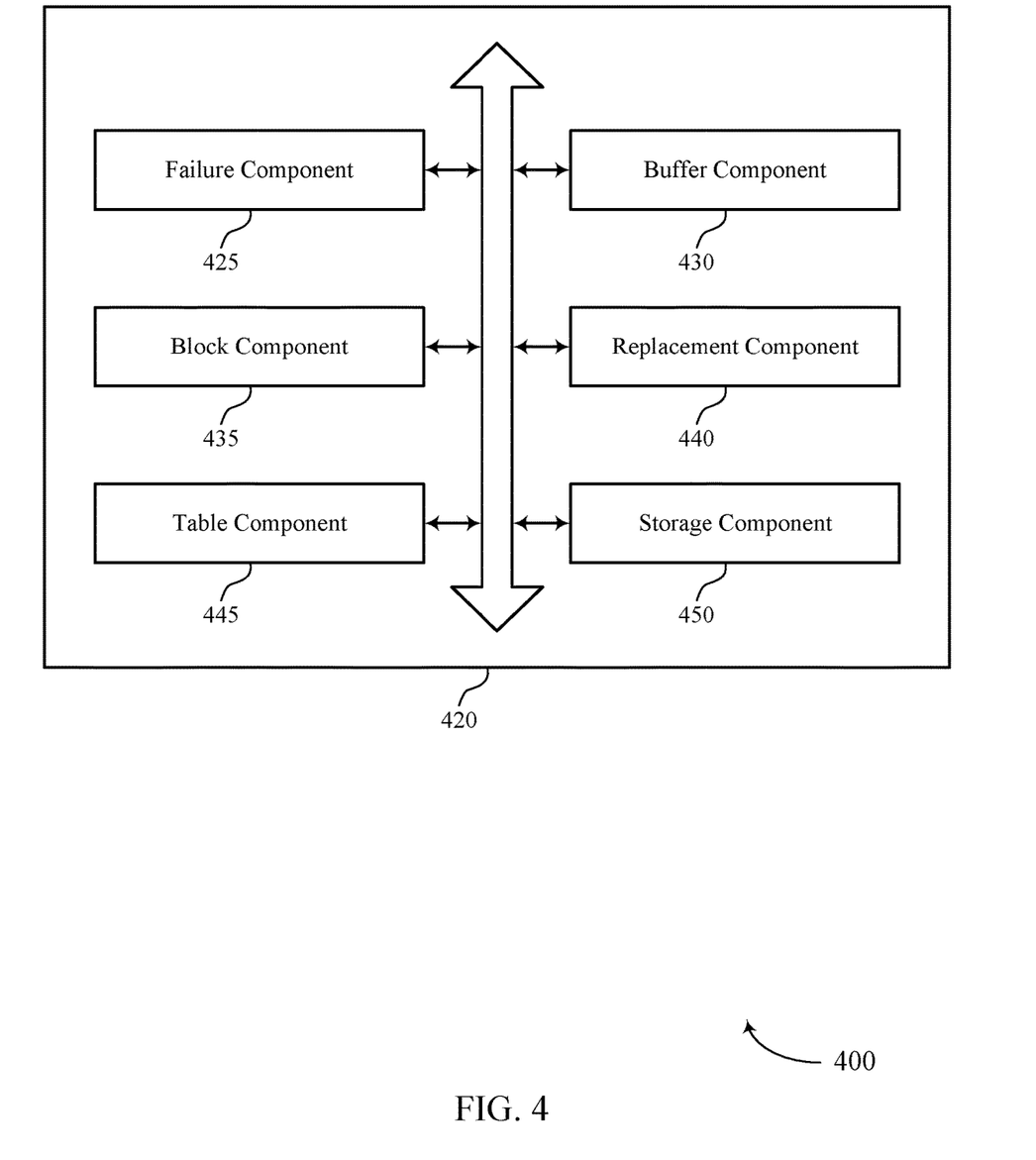
FIG. 4 shows a block diagram of a memory system that supports techniques for failure management in memory systems in accordance with examples as disclosed herein.

FIG. 4 shows a block diagram 400 of a memory system 420 that supports techniques for failure management in memory systems in accordance with examples as disclosed herein. The memory system 420 may be an example of aspects of a memory system as described with reference to FIGS. 1 through 3. The memory system 420, or various components thereof, may be an example of means for performing various aspects of techniques for failure management in memory systems as described herein. For example, the memory system 420 may include a failure component 425, a buffer component 430, a block component 435, a replacement component 440, a table component 445, a storage component 450, or any combination thereof. Each of these components may communicate, directly or indirectly, with one another (e.g., via one or more buses).

The failure component 425 may be configured as or otherwise support a means for detecting a failure within a first physical block of memory cells, the first physical block included in a virtual block including a set of physical blocks of memory cells, each physical block of the virtual block within a different plane of one or more non-volatile memory devices of the memory system. The buffer component 430 may be configured as or otherwise support a means for transferring data from the first physical block to a buffer of the memory system based at least in part on detecting the failure in the first physical block. The block component 435 may be configured as or otherwise support a means for transferring the data from the buffer to one or more physical blocks different than the first physical block and within the virtual block that includes the first physical block.

In some examples, the buffer component 430 may be configured as or otherwise support a means for transferring second data from a host system to the buffer. In some examples, the buffer component 430 may be configured as or otherwise support a means for storing the second data and the data from the first physical block in the buffer concurrently.

In some examples, the block component 435 may be configured as or otherwise support a means for transferring the second data from the buffer to one or more other physical blocks different than the first physical block and within the virtual block that includes the first physical block, the second data transferred from the buffer to the one or more other physical blocks concurrently with the transferring of the data from the buffer to the one or more physical blocks.

In some examples, to support transferring the second data from the host system to the buffer, the buffer component 430 may be configured as or otherwise support a means for transferring the second data from the host system to the buffer concurrently with transferring the data from the first physical block to the buffer.

In some examples, the replacement component 440 may be configured as or otherwise support a means for refraining from replacing the first physical block with a redundant physical block based at least in part on transferring the data to the one or more physical blocks, where the virtual block has a first capacity corresponding to a first quantity of physical blocks before detecting the failure and a second capacity corresponding to a second quantity of physical blocks after the refraining, the second quantity smaller than the first quantity.

In some examples, the storage component 450 may be configured as or otherwise support a means for storing, in the virtual block and based at least in part on the virtual block having the second capacity, first data associated with garbage collect operations, system data, second data associated with a first chunk size smaller than a second chunk size associated with third data stored in the virtual block before detecting the failure, or any combination thereof.

In some examples, the replacement component 440 may be configured as or otherwise support a means for replacing the first physical block with a second physical block after transferring the data from the buffer to the one or more physical blocks.

In some examples, a plane of the one or more non-volatile memory devices may include both the first physical block and the second physical block.

In some examples, the first physical block has a first block address within the plane of the one or more non-volatile memory devices. In some examples, the second physical block has a second block address within the plane of the one or more non-volatile memory devices. In some examples, each other physical block of the set of physical blocks has the first block address within the different plane that includes the physical block.

In some examples, the table component 445 may be configured as or otherwise support a means for updating a table associated with the virtual block to indicate the failure within the first physical block based at least in part on detecting the failure within the first physical block, the table including a set of indexes that each correspond to a physical block of the set of physical blocks included in the virtual block.

In some examples, to support updating the table, the table component 445 may be configured as or otherwise support a means for removing, from the table, a first index of the set of indexes that corresponds to the first physical block.

In some examples, each physical block of the virtual block has a same block address within the different plane that includes the physical block.

In some examples, the buffer includes volatile memory cells, RAM cells, SRAM cells, DRAM cells, or any combination thereof.

In some examples, the memory cells are NAND memory cells.

Figure 5:
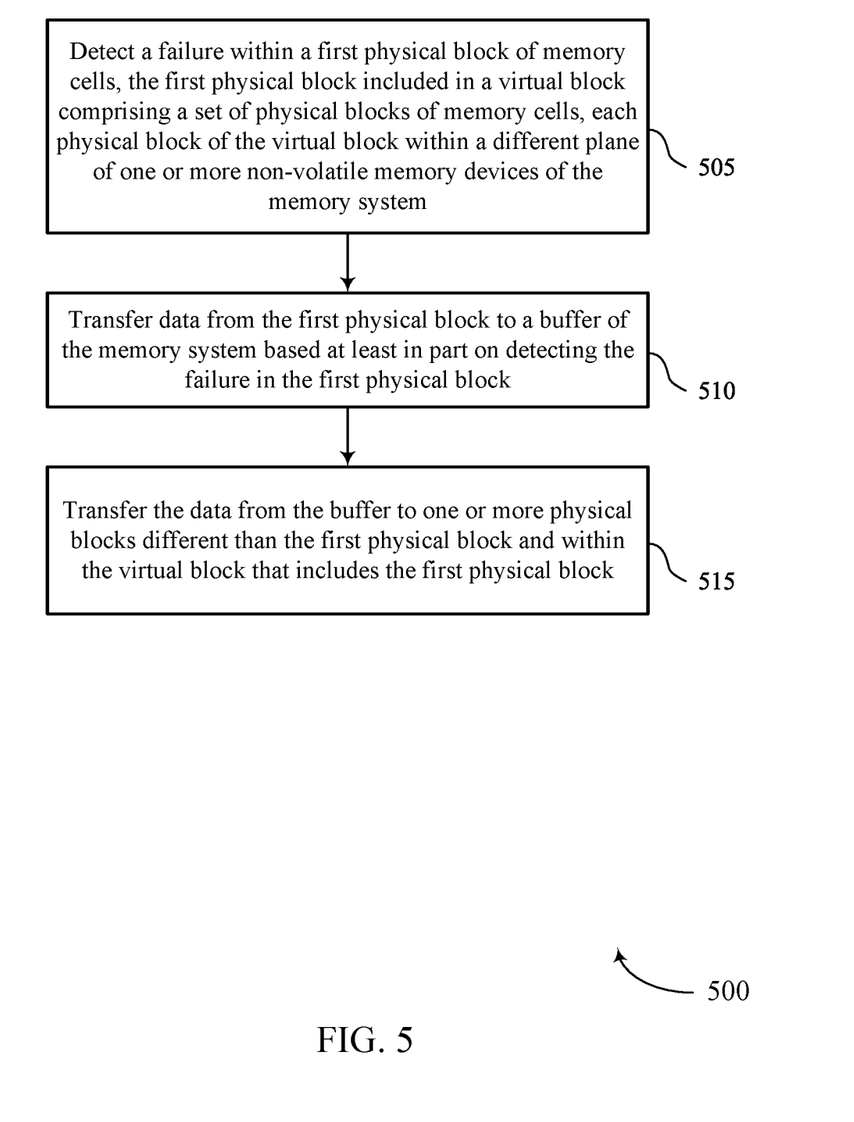
FIG. 5 shows a flowchart illustrating a method or methods that support techniques for failure management in memory systems in accordance with examples as disclosed herein.

FIG. 5 shows a flowchart illustrating a method 500 that supports techniques for failure management in memory systems in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally or alternatively, the memory system may perform aspects of the described functions using special-purpose hardware.

At 505, the method may include detecting a failure within a first physical block of memory cells, the first physical block included in a virtual block including a set of physical blocks of memory cells, each physical block of the virtual block within a different plane of one or more non-volatile memory devices of the memory system. The operations of 505 may be performed in accordance with examples as disclosed herein. In some examples, aspects of the operations of 505 may be performed by a failure component 425 as described with reference to FIG. 4.

At 510, the method may include transferring data from the first physical block to a buffer of the memory system based at least in part on detecting the failure in the first physical block. The operations of 510 may be performed in accordance with examples as disclosed herein. In some examples, aspects of the operations of 510 may be performed by a buffer component 430 as described with reference to FIG. 4.

At 515, the method may include transferring the data from the buffer to one or more physical blocks different than the first physical block and within the virtual block that includes the first physical block. The operations of 515 may be performed in accordance with examples as disclosed herein. In some examples, aspects of the operations of 515 may be performed by a block component 435 as described with reference to FIG. 4.

In some examples, an apparatus as described herein may perform a method or methods, such as the method 500. The apparatus may include, features, circuitry, logic, means, or instructions (e.g., a non-transitory computer-readable medium storing instructions executable by a processor) for detecting a failure within a first physical block of memory cells, the first physical block included in a virtual block including a set of physical blocks of memory cells, each physical block of the virtual block within a different plane of one or more non-volatile memory devices of the apparatus, transferring data from the first physical block to a buffer of the apparatus based at least in part on detecting the failure in the first physical block, and transferring the data from the buffer to one or more physical blocks different than the first physical block and within the virtual block that includes the first physical block.

Some examples of the method 500 and the apparatus described herein may further include operations, features, circuitry, logic, means, or instructions for transferring second data from a host system to the buffer and storing the second data and the data from the first physical block in the buffer concurrently.

Some examples of the method 500 and the apparatus described herein may further include operations, features, circuitry, logic, means, or instructions for transferring the second data from the buffer to one or more other physical blocks different than the first physical block and within the virtual block that includes the first physical block, the second data transferred from the buffer to the one or more other physical blocks concurrently with the transferring of the data from the buffer to the one or more physical blocks.

In some examples of the method 500 and the apparatus described herein, operations, features, circuitry, logic, means, or instructions for transferring the second data from the host system to the buffer may include operations, features, circuitry, logic, means, or instructions for transferring the second data from the host system to the buffer concurrently with transferring the data from the first physical block to the buffer.

Some examples of the method 500 and the apparatus described herein may further include operations, features, circuitry, logic, means, or instructions for refraining from replacing the first physical block with a redundant physical block based at least in part on transferring the data to the one or more physical blocks, where the virtual block may have a first capacity corresponding to a first quantity of physical blocks before detecting the failure and a second capacity corresponding to a second quantity of physical blocks after the refraining, the second quantity smaller than the first quantity.

Some examples of the method 500 and the apparatus described herein may further include operations, features, circuitry, logic, means, or instructions for storing, in the virtual block and based at least in part on the virtual block having the second capacity, first data associated with garbage collect operations, system data, second data associated with a first chunk size smaller than a second chunk size associated with third data stored in the virtual block before detecting the failure, or any combination thereof.

Some examples of the method 500 and the apparatus described herein may further include operations, features, circuitry, logic, means, or instructions for replacing the first physical block with a second physical block after transferring the data from the buffer to the one or more physical blocks.

In some examples of the method 500 and the apparatus described herein, a plane of the one or more non-volatile memory devices includes the first physical block and the second physical block.

In some examples of the method 500 and the apparatus described herein, the first physical block may have a first block address within the plane of the one or more non-volatile memory devices, the second physical block may have a second block address within the plane of the one or more non-volatile memory devices, and each other physical block of the set of physical blocks may have the first block address within the different plane that includes the physical block.

Some examples of the method 500 and the apparatus described herein may further include operations, features, circuitry, logic, means, or instructions for updating a table associated with the virtual block to indicate the failure within the first physical block based at least in part on detecting the failure within the first physical block, the table including a set of indexes that each correspond to a physical block of the set of physical blocks included in the virtual block.

In some examples of the method 500 and the apparatus described herein, operations, features, circuitry, logic, means, or instructions for updating the table may include operations, features, circuitry, logic, means, or instructions for removing, from the table, a first index of the set of indexes that corresponds to the first physical block.

In some examples of the method 500 and the apparatus described herein, each physical block of the virtual block may have a same block address within the different plane that includes the physical block.

In some examples of the method 500 and the apparatus described herein, the buffer may include volatile memory cells, RAM cells, SRAM cells, DRAM cells, or any combination thereof.

In some examples of the method 500 and the apparatus described herein, the memory cells may be NAND memory cells.

It should be noted that the methods described above describe possible implementations, and that the operations and the steps may be rearranged or otherwise modified and that other implementations are possible. Further, portions from two or more of the methods may be combined.

An apparatus is described. The apparatus may include one or more non-volatile memory devices, a buffer, and a controller coupled with the one or more non-volatile memory devices and the buffer. The controller may be configured to cause the apparatus to detect a failure within a first physical block of memory cells, the first physical block included in a virtual block including a set of physical blocks of memory cells, each physical block of the virtual block within a different plane of the one or more non-volatile memory devices, transfer data from the first physical block to the buffer based at least in part on detecting the failure in the first physical block, and transfer the data from the buffer to one or more physical blocks different than the first physical block and within the virtual block that includes the first physical block.

In some examples of the apparatus, the controller may be further configured to cause the apparatus to transfer second data from a host system to the buffer and store the second data and the data from the first physical block in the buffer concurrently.

In some examples of the apparatus, the controller may be further configured to cause the apparatus to transfer the second data from the buffer to one or more other physical blocks different than the first physical block and within the virtual block that includes the first physical block, the second data transferred from the buffer to the one or more other physical blocks concurrently with the transferring of the data from the buffer to the one or more physical blocks.

In some examples of the apparatus, to support transferring the second data from the host system to the buffer, the controller may be further configured to cause the apparatus to transfer the second data from the host system to the buffer concurrently with transferring the data from the first physical block to the buffer.

In some examples of the apparatus, the controller may be further configured to cause the apparatus to refrain from replacing the first physical block with a redundant physical block based at least in part on transferring the data to the one or more physical blocks, where the virtual block may have a first capacity corresponding to a first quantity of physical blocks before detecting the failure and a second capacity corresponding to a second quantity of physical blocks after the refraining, the second quantity smaller than the first quantity.

In some examples of the apparatus, the controller may be further configured to cause the apparatus to store, in the virtual block and based at least in part on the virtual block having the second capacity, first data associated with garbage collect operations, system data, second data associated with a first chunk size smaller than a second chunk size associated with third data stored in the virtual block before detecting the failure, or any combination thereof.

In some examples of the apparatus, the controller may be further configured to cause the apparatus to replace the first physical block with a second physical block after transferring the data from the buffer to the one or more physical blocks.

In some examples of the apparatus, a plane of the one or more non-volatile memory devices includes the first physical block and the second physical block.

In some examples of the apparatus, the first physical block may have a first block address within the plane of the one or more non-volatile memory devices, the second physical block may have a second block address within the plane of the one or more non-volatile memory devices, and each other physical block of the set of physical blocks may have the first block address within the different plane that includes the physical block.

In some examples of the apparatus, the controller may be further configured to cause the apparatus to update a table associated with the virtual block to indicate the failure within the first physical block based at least in part on detecting the failure within the first physical block, the table including a set of indexes that each correspond to a physical block of the set of physical blocks included in the virtual block.

In some examples of the apparatus, to support updating the table, the controller may be further configured to cause the apparatus to remove, from the table, a first index of the set of indexes that corresponds to the first physical block.

In some examples of the apparatus, each physical block of the virtual block may have a same block address within the different plane that includes the physical block.

In some examples of the apparatus, the buffer includes volatile memory cells, RAM cells, SRAM cells, DRAM cells, or any combination thereof.

In some examples of the apparatus, the memory cells may be NAND memory cells.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
   one or more non-volatile memory devices;
   a buffer; and one or more controllers coupled with the one or more non-volatile memory devices and the buffer, the one or more controllers configured to cause the memory system to:
  detect a failure within a first physical block of memory cells in the one or more non-volatile memory devices, the first physical block included in a virtual block of memory cells; and
  transmit, using the buffer, data from the first physical block to one or more other physical blocks within the virtual block based at least in part on detecting the failure in the first physical block.

2. The memory system of claim 1, wherein the one or more controllers are further configured to cause the memory system to:
  perform, using the buffer, one or more access operations associated with the virtual block concurrent with transmitting the data using the buffer.

3. The memory system of claim 1, wherein the one or more controllers are further configured to cause the memory system to:
  recover the data from one or more pages of the first physical block based at least in part on the failure; and
  store the data to the buffer based at least in part on recovering the data, wherein transmitting the data using the buffer is based at least in part on storing the data to the buffer.

4. The memory system of claim 1, wherein the one or more controllers are further configured to cause the memory system to:
  transmit second data from a host system to the buffer; and
  store the second data and the data from the first physical block in the buffer concurrently.

5. The memory system of claim 4, wherein the one or more controllers are further configured to cause the memory system to:
  transmit the second data from the buffer to the one or more other physical blocks within the virtual block, the second data transmitted from the buffer concurrently with transmitting the data from the buffer to the one or more other physical blocks.

6. The memory system of claim 2, wherein, to transmit the second data from the host system to the buffer, the one or more controllers are further configured to cause the memory system to:
  transmit the second data from the host system to the buffer concurrently with transmitting the data from the first physical block to the buffer.

7. The memory system of claim 1, wherein the one or more controllers are further configured to cause the memory system to:
  refrain from replacing the first physical block with a third physical block based at least in part on transmitting the data to the one or more other physical blocks, wherein the virtual block has a first threshold corresponding to a first quantity of physical blocks before detecting the failure and a second threshold corresponding to a second quantity of physical blocks after the refraining, the second quantity smaller than the first quantity.

8. The memory system of claim 7, wherein the one or more controllers are further configured to cause the memory system to:
  store, in the virtual block, first data associated with garbage collect operations, system data, second data associated with a first chunk size smaller than a second chunk size associated with third data stored in the virtual block before detecting the failure, or any combination thereof.

9. The memory system of claim 1, wherein the one or more controllers are further configured to cause the memory system to:
  replace the first physical block with a second physical block after transmitting the data from the buffer to the one or more other physical blocks.

10. The memory system of claim 9, wherein:
  the virtual block comprises a set of physical blocks of memory cells, each physical block of the virtual block within a different plane of the one or more non-volatile memory devices,
  a plane of the one or more non-volatile memory devices comprises the first physical block and the second physical block,
  the first physical block has a first block address within the plane,
  the second physical block has a second block address within the plane, and
  each other physical block has the first block address within the different plane that comprises the other physical block.

11. The memory system of claim 1, wherein the one or more controllers are further configured to cause the memory system to:
  update a table associated with the virtual block to indicate the failure within the first physical block based at least in part on detecting the failure within the first physical block, the table comprising a set of indexes that each correspond to a physical block included in the virtual block.

12. The memory system of claim 11, wherein, to update the table, the one or more controllers are further configured to cause the memory system to:
  erase, from the table, a first index of the set of indexes that corresponds to the first physical block.

13. The memory system of claim 1, wherein detecting the failure in the first physical block of memory cells comprises:
  performing one or more access operations on the first physical block of memory cells; and
  determining that at least one of the one or more access operations failed.

14. A non-transitory computer-readable medium storing code comprising instructions which, when executed by one or more processors of an electronic device, cause the electronic device to:
  detect a failure within a first physical block of memory cells in one or more non-volatile memory devices, the first physical block included in a virtual block of memory cells; and
  transmit, using a buffer, data from the first physical block to one or more other physical blocks within the virtual block based at least in part on detecting the failure in the first physical block.

15. The non-transitory computer-readable medium of claim 14, wherein the instructions, when executed by the one or more processors of the electronic device, further cause the electronic device to:
  transmit second data from a host system to the buffer; and
  store the second data and the data from the first physical block in the buffer concurrently.

16. The non-transitory computer-readable medium of claim 15, wherein the instructions, when executed by the one or more processors of the electronic device, further cause the electronic device to:

transmit the second data from the buffer to the one or more other physical blocks within the virtual block, the second data transmitted from the buffer concurrently with transmitting the data from the buffer to the one or more other physical blocks.

17. The non-transitory computer-readable medium of claim 14, wherein the instructions, when executed by the one or more processors of the electronic device, further cause the electronic device to:

replace the first physical block with a second physical block after transmitting the data from the buffer to the one or more other physical blocks.

18. The non-transitory computer-readable medium of claim 14, wherein the instructions, when executed by the one or more processors of the electronic device, further cause the electronic device to:

update a table to indicate the failure within the first physical block based at least in part on detecting the failure, the table comprising a set of indexes that each correspond to a physical block included in the virtual block.

19. A method by a memory system, comprising:

detecting a failure within a first physical block of memory cells in one or more non-volatile memory devices, the first physical block included in a virtual block of memory cells; and transmitting, using a buffer, data from the first physical block to one or more other physical blocks within the virtual block based at least in part on detecting the failure in the first physical block.

20. The method of claim 19, further comprising:

transmitting second data from a host system to the buffer, wherein the second data and the data from the first physical block are stored in the buffer concurrently; and transmitting the second data from the buffer to the one or more other physical blocks within the virtual block, the second data transmitting from the buffer to the one or more other physical blocks concurrently with transmitting the data from the buffer to the one or more other physical blocks.

* * * * *